April 26, 1955 W. E. MARTIN 2,707,114
ADJUSTABLE MOUNTING MEANS FOR TRAILER HITCH FOR TRUCKS
Filed March 1, 1950 2 Sheets-Sheet 1
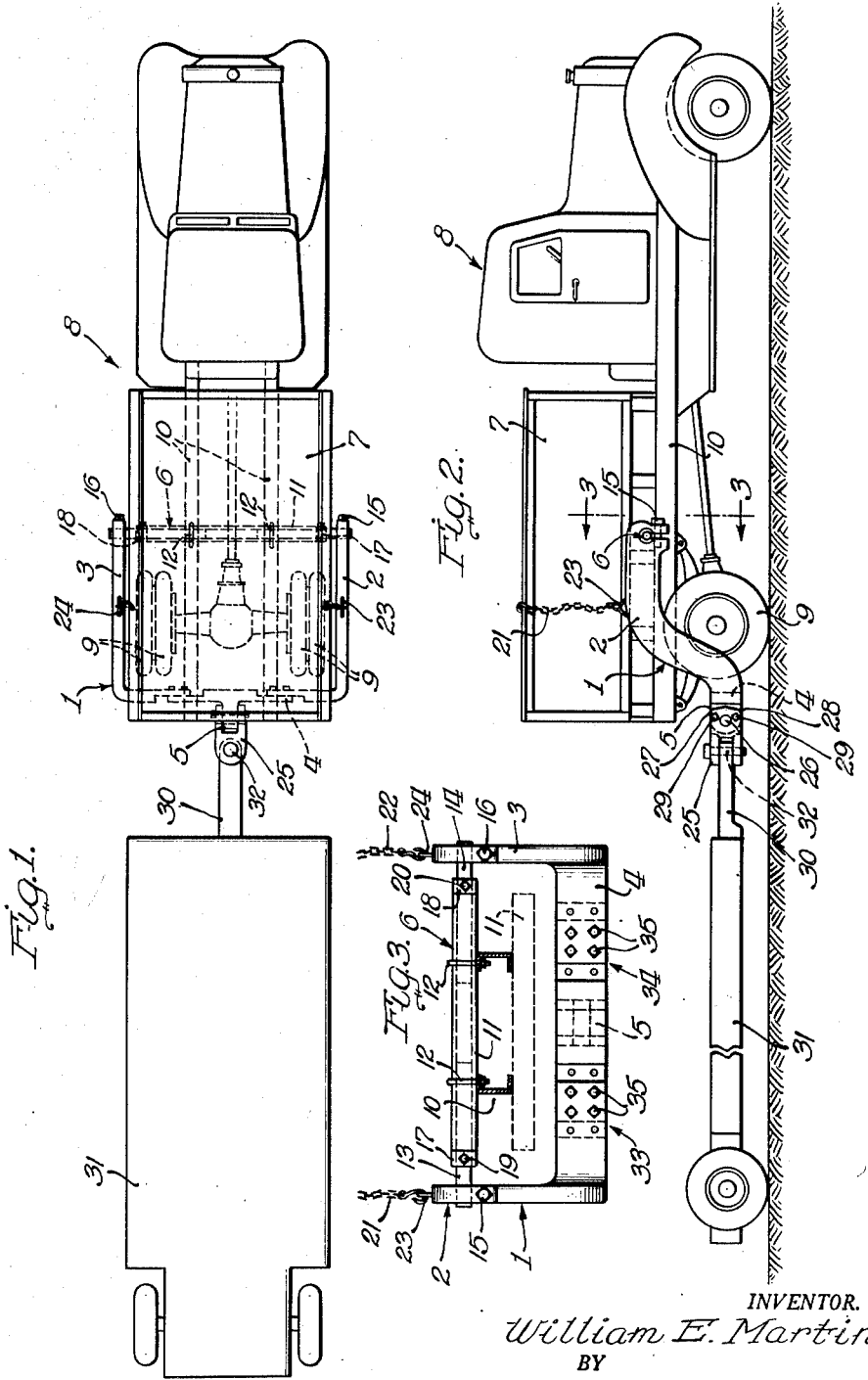
INVENTOR.
William E. Martin
BY
Eberhard E. Wettley
Atty.

April 26, 1955  W. E. MARTIN  2,707,114
ADJUSTABLE MOUNTING MEANS FOR TRAILER HITCH FOR TRUCKS
Filed March 1, 1950  2 Sheets-Sheet 2
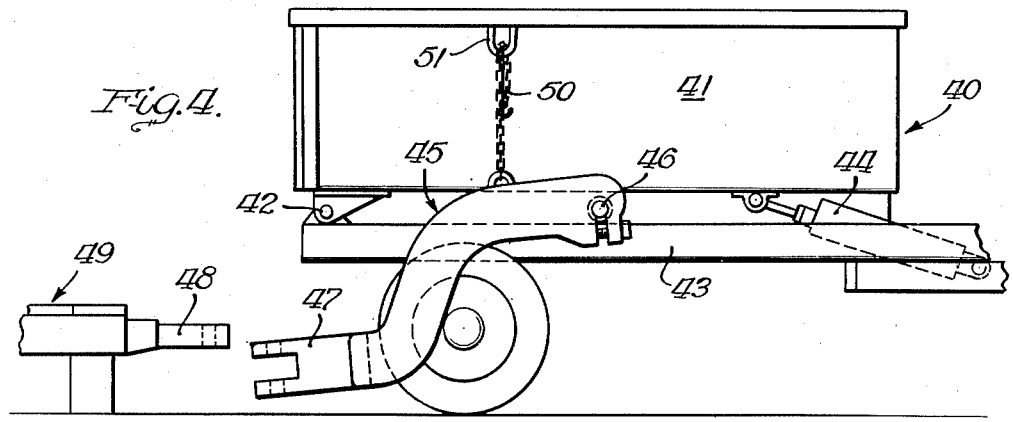
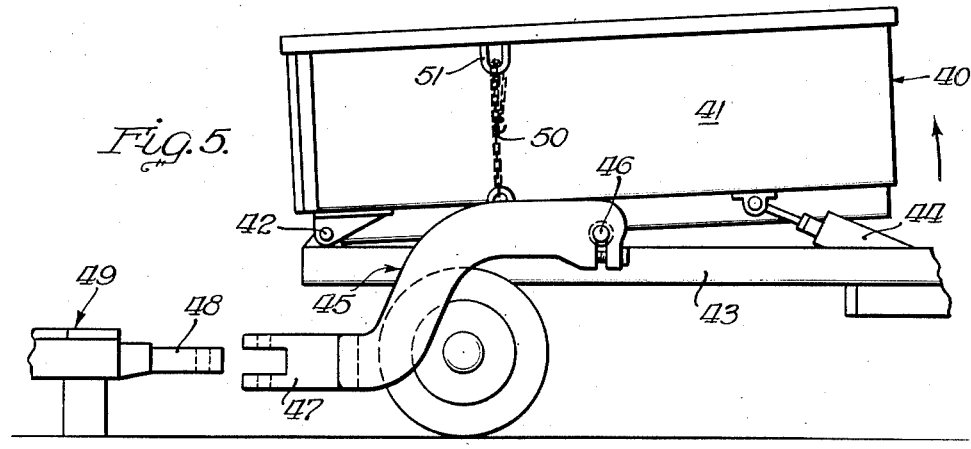
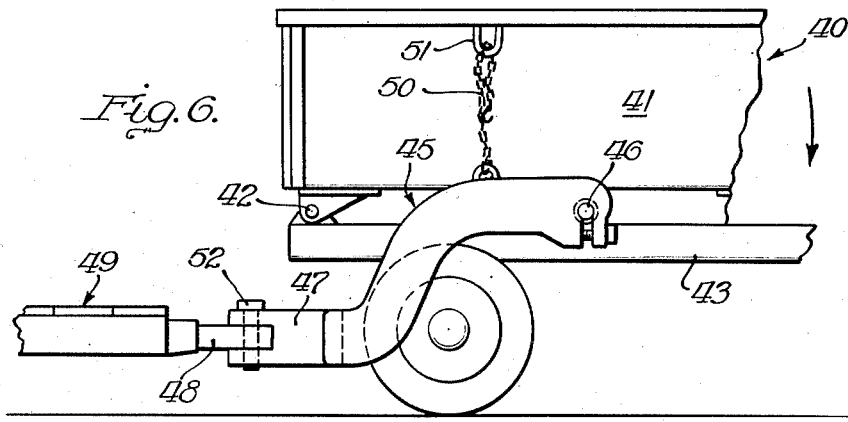
INVENTOR.
William E. Martin
BY
Eberhard E. Wettley
Atty.

United States Patent Office 2,707,114
Patented Apr. 26, 1955

2,707,114

ADJUSTABLE MOUNTING MEANS FOR TRAILER HITCH FOR TRUCKS

William E. Martin, Kewanee, Ill.

Application March 1, 1950, Serial No. 147,101

5 Claims. (Cl. 280—496)

This invention relates to a convenient form of hitch for auxiliary use with a conventional type of dump or fixed body truck for the purpose of coupling same with a trailer to tow the latter from place to place.

One of the main objects of the present invention is to convert a truck into a hauling unit with a simple connected hitch and one that may be detached from the truck if desired when the truck is not used for hauling a trailing vehicle.

Another object of the hitch of this construction is to provide a load carrying coupling that can be used to support the tongue end of the trailing vehicle when the latter comprises a flat bed machinery hauling semi-trailer or like vehicle.

The hitch further provides an arrangement for hauling purposes which is adapted to support trailing loads at a single point, or at several points, all situated forwardly of the rear axle and rear wheels of the truck carrying such a hitch. This manner of hitch connection with a truck does not act to unbalance the load characteristics of the truck as would hitches that are connected at proper clearance levels to the rear of the rear axle and wheels which exert an overbalance load having the tendency to raise the forward end of the truck.

Any hitches tending to raise the front truck wheels or to reduce front wheel contact or ground friction are inefficient and undesirable for purposes of this kind. The hitch of this invention introduces a downward load between the front and back truck wheels where this load becomes beneficial to the tractive effort of the truck which enhances the hauling operation thereof as a great rolling load burden is being drawn by the truck by means of the hitch.

Simple attaching means are employed for securing the mounting units for the hitch to the truck together with readily adjustable means for positioning and centering the hitch with respect to the truck as needed for clearance purposes and for free operation.

Above all, the hitch comprises a means for eliminating a special and expensive tractor vehicle usable only for hauling a trailing vehicle, and provides an inexpensive means to convert an ordinary truck into an efficient hauling vehicle for trailers and the like.

The hitch also includes means to raise the same by a suitable and convenient connection with a part of a dump body of a dump truck in order to utilize the body raising power means to lift the hitch into a position for connection with the tongue of a trailer. Since the truck end of the hitch is pivotally carried forwardly of the rear truck wheels, it is possible to use a chain or other tie means to connect between the hitch at points rearwardly of the pivotal connection, and with the rear part of the dump body to transmit the raising motion of the truck body under power into a lifting of the hitch produced through rotation of the same about its pivotal mounting thereby elevating the tongue end of the hitch to the connecting level of the trailer tongue. A similar arrangement of chain or other link means can be used with a dump body of a dump truck to raise the hitch into truck attaching position if desired.

Other objects and advantages relating to the device of the present invention shall hereinafter appear in the following detailed description having reference to the accompanying drawings forming a part of this specification.

In the drawings:

Figs. 1 is a plan view of the hitch and its associated parts as connected with a conventional truck and as used to haul a semi-trailer by connection with its tongue;

Fig. 2 comprises a side view of the vehicles shown in Fig. 1 as the appear when connected by means of the hitch of the present invention;

Fig. 3 is an end view of the hitch as seen from the truck end thereof and as viewed substantially along the line 3—3 in Fig. 2 showing the hitch mounted upon the truck chassis which is indicated in section.

Fig. 4 is a side elevational view of the hitch as applied to a dump truck to illustrate the using of the raising of the truck body as a means for adjusting the tongue level of the hitch.

Fig. 5 shows the hitch raised to the level of a trailer tongue through upward actuation of the truck dump body; and Fig. 6 illustrates the vehicles as they appear when connected and with the dump body returned to its normal horizontal position upon the truck frame or chassis.

The hitch comprises a U-frame 1 having a divided end formed with spaced draw bars 2 and 3 and a closed end formed with a cross bar 4 having a hitch tongue 5 connected therewith for towing purposes. The draw bars 2 and 3 terminate in a higher plane than the tongue 5 and are each connected with opposite ends of the removable and adjustable truck mounting 6 of the hitch structure which is connected with the truck forwardly of the rear wheels thereof.

As best shown in Fig. 1, the bars 2 and 3 of the hitch are also spaced to straddle the body 7 of a conventional truck 8 and also to straddle the rear wheels 9 of the truck. The rearward ends of bars 2 and 3 drop downwardly from the level of the truck chassis 10 to the level shown in Fig. 2 by which shapes the draw bars place the cross bar 4 in clearance position to the rear of truck wheels 9, but below the truck chassis 10 and below its body 7.

The truck mounting 6 comprises a tube 11 which may be secured upon the truck chassis 10 by means of brackets or suitable U-bolts 12. This tube 11 may rest upon the chassis 10 as best shown in Fig. 3, or it may be suspended beneath the chassis as indicated in broken lines. A pair of tubes or shafts 13 and 14 are each provided for edgewise insertion into the tube 11, and these shafts are adapted for rotative action in said mounting tube about the axis of said tube.

As shown in Fig. 1, the forward ends of the draw bars 2 and 3 are each split and include suitable openings to receive the laterally outer ends of the shafts 13 and 14, the latter being secured to the draw bars 2 and 3 by draw bolts 15 and 16. Thus the truck end of hitch 1 may swing vertically about the axis of the mounting 6 with shafts 13 and 14 providing the fulcrums within the common tube 11 of the mounting. Endwise shifting of the shafts 13 and 14 and of the entire hitch 1 relative to the truck and chassis are prevented by suitable collars 17 and 18 that are fastened to the shafts 13 and 14 by set screws 19 and 20 respectively.

Suitable supporting means such as chains 21 and 22 are releasably connected with bails 23 and 24 carried by the draw bars 2 and 3, and these chains hook onto the truck body 7. When the hitch 1 is in towing position as seen in Fig. 2, chains 21 and 22 are slack but such chains will function to support the free rear end of the hitch 1 when no trailing vehicle is connected with the hitch 1.

The coupling means of the hitch comprises a double bifurcated clevis 25 pivotally carried on a transverse horizontal pin 26 connected with the cross bar tongue 5. Clevis 25 has limited pivoted movement on pin 26 as determined by shoulders 27 and 28 of the clevis which engage the side of cross bar 4. Suitable set screws or through bolts 29 coacting with proper openings in tongue 5 are employed to lock the clevis 25 against rotation about the pin 26 to provide tongue 30 of the semi-trailer 31 with an extended support through the hitch 1 and upon the mounting 6 of the truck 8. With the adjustably swingable clevis 25, it is possible to obtain certain variations in the vertical location of the mounting 6 and a corresponding variation in the angularity of the hitch with respect to the ground so as to maintain the height of the tongue 30 of the semi-trailer 31 as near level as possible for transportation.

Pivot pin 32 passing through aligned openings in clevis 25 and tongue 30 provides the coupling for the tongue parts and functions to let the semi-trailer 31 swing about its draft connection with the hitch 1 when these vehicles are rounding curves or weaving over roadways or rough ground during transporation.

While relative angular lateral positions of the two vehicles are accommodated by the vertical coupling pin 32, relative angular positions of the two vehicles in a vertical plane are permitted by the pivotal mounting means 6.

During use, the hitch 1 should occupy a position with the draw bars 2 and 3 as close to the sides of the towing vehicle as possible and as best seen in Fig. 1. The hitches may be made in different widths if desired for different widths of truck bodies or the cross bar 4 may be divided with overlapping or interlocking adjustable connections as shown in Fig. 3 at 33 and 34 with appropriate fastening means such as bolts 35 to allow changing the overall length of the bar 4. With this arrangement it will be possible to adjust the width of the straddle hitch 1 for proper operable clearances with the bodies of different capacity and types of trucks. Shifting of the mounting 6 location fore and aft of the truck will place the cross bar 4 in operative relation with respect to the rear truck wheels 9 and the truck chassis 10.

Referring now to Figs. 4, 5 and 6, it should be noted that the described chains 21—22 and bails 23—24 are here applied for connection with the movable body of a dump truck 40. The latter includes a dump body 41 pivoted at 42 on the chassis 43 and a hydraulic cylinder 44 pivotally connected with the chassis and body to raise the latter in a conventional manner.

The hitch 45 of Figs. 4, 5 and 6 is pivoted at 46 and has a forked tongue 47 for connection with a tongue 48 of the trailing vehicle 49. As shown in Fig. 4, the tongue 47 is not at the level of tongue 48, so by using a chain 50 connected to the hitch 45 and looped through a body bail 51 at each side of the body 41, it becomes feasible to swing the hitch about its pivot 46 by raising the body 41 about its pivot 42. The location of chains 50 between the two pivots 42 and 46 as seen in Figs. 4 to 6 provides the proper arrangement for adjusting the level of tongue 47 to a position such as shown in Fig. 5.

Backing the truck will then bring the two tongues together to receive a hitch pin 52 to interlock the two tongues at the horizontal level shown in Fig. 6 to support tongue 48 at the level shown by the hitch from the pivot 46 whereupon the dump body 41 can again be lowered thus producing slack chains 51 and leaving the hitch 45 and its connected vehicle 49 to their own movements and wandering to function in their designed capacities.

With a hitch like 45 detached from truck 40, it is also possible to use chains 50 in connection with the raiseable truck body to elevate the hitch into position for connection with its pivotal mountings 46 on the truck chassis 43.

Any changes or modifications in the exact combination of elements or in the individual elements themselves as compared to the disclosure in the drawings shall be governed by the breadth and scope of the appended claims defining the straddle truck hitch of this invention.

What I claim is:

1. A trailer hitch for operable connection with a truck chassis comprising draw bars, a cross bar connected with said draw bars at one end, a single mounting unit arranged and secured in crosswise position on said truck chassis, pivotally supported end projections slidably carried by said mounting unit and in positions disposed laterally outwardly with respect to said truck chassis and said mounting unit for the support of said draw bars from said chassis, and a hitch connection on said cross bar, said draw bars being connected with said pivoted end projections of the transversely arranged mounting unit and in positions to laterally straddle said truck chassis and to position said cross bar hitch beneath said chassis and behind the rear wheels of the truck.

2. A detachable trailer hitch for a road vehicle comprising a bodily removable tubular mounting carried in transverse position across the vehicle chassis, endwise slidable trunnion members pivotally supported within opposite terminal portions of said tubular mounting and arranged in locations disposed laterally outwardly with respect to the side portions of said vehicle and beyond the terminal ends of said trunnions, and a draw bar having a draft unit at one end for connection with a trailing vehicle, said draw bar having twin ends at the other end thereof with said ends being spaced to clear the sides of said vehicle and with each end including releasable attachment means to connect with one of the trunnion members of said tubular mounting.

3. A detachable trailer hitch for a road vehicle comprising a bodily removable tubular mounting fastened in transverse position across the vehicle chassis, laterally adjustable end extensions pivotally supported within opposite terminal portions of said tubular mounting and in locations disposed laterally outwardly with respect to the side portions of said vehicle, and a draw bar having a double hitch at one end adapted for connection with the end extensions respectively and having a draft unit for connection with a trailing vehicle, said draw bar hitches being spaced to clear the sides of said vehicle with each hitch including releasable attachment means to connect with the end extensions of said tubular mounting, and releasable abutment means connected with said end extensions respectively to engage adjacent portions of the opposite ends of said tubular mounting to thereby counteract relative lateral movement between said mounting and said end extensions respectively.

4. A detachable hitch for a truck comprising a draw bar having one end adapted for connection with a trailing vehicle, separated hitch members on the other end of said draw bar, said hitch members being spaced laterally outwardly with respect to the longitudinal sides of the truck, a single mounting unit transversely carried by said truck, fastening means to adjustably position said mounting unit in the transverse direction of said truck, pivotally supported trunnion members providing slidable end extensions for said mounting unit and constructed and arranged for lateral adjustable disposition adjacent the longitudinal sides of said truck and beyond the terminal ends of the mounting unit, said draw bar hitch members each having connection with said trunnion members respectively.

5. A hitch for bodily securement to a truck comprising a bifurcated draw bar, a tubular support, fastening means to secure said tubular support upon the truck and hitch members pivotally carried at opposite ends of said support for the reception of said bifurcated draw bar sections respectively, said hitch members being slidably carried by said tubular support for endwise adjustment relatively to said support and with respect to each other for the accommodation of different widths of bifurcated draw bars.

References Cited in the file of this patent

UNITED STATES PATENTS

| | | |
|---|---|---|
| 1,390,154 | Venteboom | Sept. 6, 1921 |
| 1,914,963 | Stephens | June 20, 1933 |
| 2,090,891 | Kuns | Aug. 24, 1937 |
| 2,163,999 | Jacks | June 27, 1939 |
| 2,237,166 | Schoenrock | Apr. 1, 1941 |
| 2,392,903 | Currie | Jan. 15, 1946 |
| 2,434,693 | Graham | Jan. 20, 1948 |
| 2,471,636 | Martin | May 31, 1949 |
| 2,481,898 | Bevan | Sept. 13, 1949 |

FOREIGN PATENTS

| | | |
|---|---|---|
| 437,359 | Germany | Nov. 16, 1926 |